(12) United States Patent
Park

(10) Patent No.: US 12,712,384 B2
(45) Date of Patent: Aug. 18, 2026

(54) WIRELESS CHARGING SYSTEM HAVING CENTRAL AND PERIPHERAL SENSORS

(71) Applicant: Samsung SDI Co., Ltd., Yongin-si (KR)

(72) Inventor: Sanghun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 802 days.

(21) Appl. No.: 18/149,863

(22) Filed: Jan. 4, 2023

(65) Prior Publication Data

US 2023/0216343 A1 Jul. 6, 2023

(30) Foreign Application Priority Data

Jan. 5, 2022 (KR) ........................ 10-2022-0001450

(51) Int. Cl.
*H02J 50/10* (2016.01)
*H02J 7/90* (2026.01)

(52) U.S. Cl.
CPC .............. *H02J 50/10* (2016.02); *H02J 7/933* (2026.01); *H02J 7/975* (2026.01)

(58) Field of Classification Search
CPC ........................................................ H02J 50/10
USPC ........................................................... 320/108
See application file for complete search history.

(56) References Cited

U.S. PATENT DOCUMENTS

2007/0182367 A1* 8/2007 Partovi ................... H02J 50/12 320/108
2019/0097278 A1* 3/2019 Park ........................ G01B 7/16
2020/0379049 A1* 12/2020 Gray .................... G01R 31/367
2021/0028657 A1* 1/2021 Goodchild ............. G01V 3/081
2022/0077722 A1 3/2022 Seo et al.

FOREIGN PATENT DOCUMENTS

KR 20-2009-0002764 U 3/2009
KR 10-2009-0120268 A 11/2009
KR 10-1152662 B1 6/2012
KR 10-2020-0100976 A 8/2020
KR 10-2021-0059862 A 5/2021
KR 10-2287618 B1 8/2021
WO WO-2021016492 A1 * 1/2021 ............ H02J 50/005

OTHER PUBLICATIONS

Korean Office Action dated Dec. 1, 2023, issued in corresponding Korean Patent Application No. 10-2022-0001450 (5 pages).

* cited by examiner

*Primary Examiner* — Yalkew Fantu

(74) *Attorney, Agent, or Firm* — Womble Bond Dickinson (US) LLP

(57) ABSTRACT

A wireless charging system for charging a secondary battery, the wireless charging system including: a central sensor configured to sense a swelling of the secondary battery; a peripheral sensor on a peripheral portion of the central sensor and configured to sense the swelling of the secondary battery; and a sensitivity ratio measurement component configured to measure a ratio of sensitivity of the peripheral sensor to sensitivity of the central sensor, wherein the sensitivity ratio measurement component is configured to stop a charging progress in response to the measured ratio of sensitivity of the peripheral sensor to sensitivity of the central sensor being greater than a preset ratio.

6 Claims, 4 Drawing Sheets

WIRELESS CHARGING SYSTEM HAVING CENTRAL AND PERIPHERAL SENSORS

CROSS-REFERENCE TO RELATED APPLICATION

The present application claims priority to and the benefit of Korean Patent Application No. 10-2022-0001450, filed on Jan. 5, 2022, in the Korean Intellectual Property Office, the entire disclosure of which is incorporated herein by reference.

BACKGROUND

1. Field

Aspects of one or more embodiments relate to a wireless charging system.

2. Description of the Related Art

When a secondary battery and a battery using the secondary battery are charged, swelling, which is a result of deterioration of the battery, may occur depending on the number of times of charging and discharging depending on the use. Because swelling is a phenomenon that affects the lifespan and abnormal operation of the battery, sensing or controlling swelling may improve the operation of a device using the secondary battery.

When the secondary battery is charged despite swelling of the secondary battery, an ignition phenomenon of the secondary battery may occur, and even if the ignition phenomenon does not occur, there is a problem in that it may be difficult to predict the amount of charging.

The above information disclosed in this Background section is only for enhancement of understanding of the background and therefore the information discussed in this Background section does not necessarily constitute prior art.

SUMMARY

Aspects of one or more embodiments relate to a wireless charging system, and for example, a wireless charging system for charging a secondary battery.

According to some embodiments, a wireless charging system may be capable of minimizing or reducing the possibility of ignition when charging a secondary battery and securing charging stability of the secondary battery by determining the swelling amount before charging a battery which uses the secondary battery and stopping the charging by predicting occurrence of an ignition phenomenon during charging.

However, such characteristics are just an example, and embodiments according to the present disclosure are not limited thereto.

Additional aspects will be set forth in part in the description which follows and, in part, will be apparent from the description, or may be learned by practice of the presented embodiments of the disclosure.

According to one or more embodiments, a wireless charging system includes a central sensor portion sensing swelling of a secondary battery, a peripheral sensor portion on a peripheral portion of the central sensor portion and sensing the swelling of the secondary battery, and a sensitivity ratio measurement portion measuring a ratio of sensitivity of the peripheral sensor portion to sensitivity of the central sensor portion, and the sensitivity ratio measurement portion stops a charging progress when the measured ratio of sensitivity of the peripheral sensor portion to sensitivity of the central sensor portion is greater than a preset ratio.

According to some embodiments, the wireless charging system may further include a sensitivity improving portion on at least one of the central sensor portion or the peripheral sensor portion.

According to some embodiments, the peripheral sensor portion may be on each of four corners of a wireless charging device.

According to some embodiments, the wireless charging system may further include a sensitivity change rate measurement portion measuring a sensitivity change rate of each of the central sensor portion and the peripheral sensor portion, and the sensitivity ratio measurement portion may stop a charging progress when the measured sensitivity change rate of each of the central sensor portion and the peripheral sensor portion compared to the beginning is greater than a preset value.

According to some embodiments, the wireless charging system may further include a temperature change measurement portion detecting a temperature change of each of the central sensor portion and the peripheral sensor portion, and the temperature may change measurement portion stops a charging progress when a measured temperature change value of each of the central sensor portion and the peripheral sensor portion is greater than a preset value.

According to some embodiments, the wireless charging system may further include an alarm portion operating an alarm when a swelling sensing value of each of the central sensor portion and the peripheral sensor portion exceeds a preset value.

Other aspects, features, and characteristics than those described above will become more apparent from the following drawings, claims, and detailed description of the disclosure.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
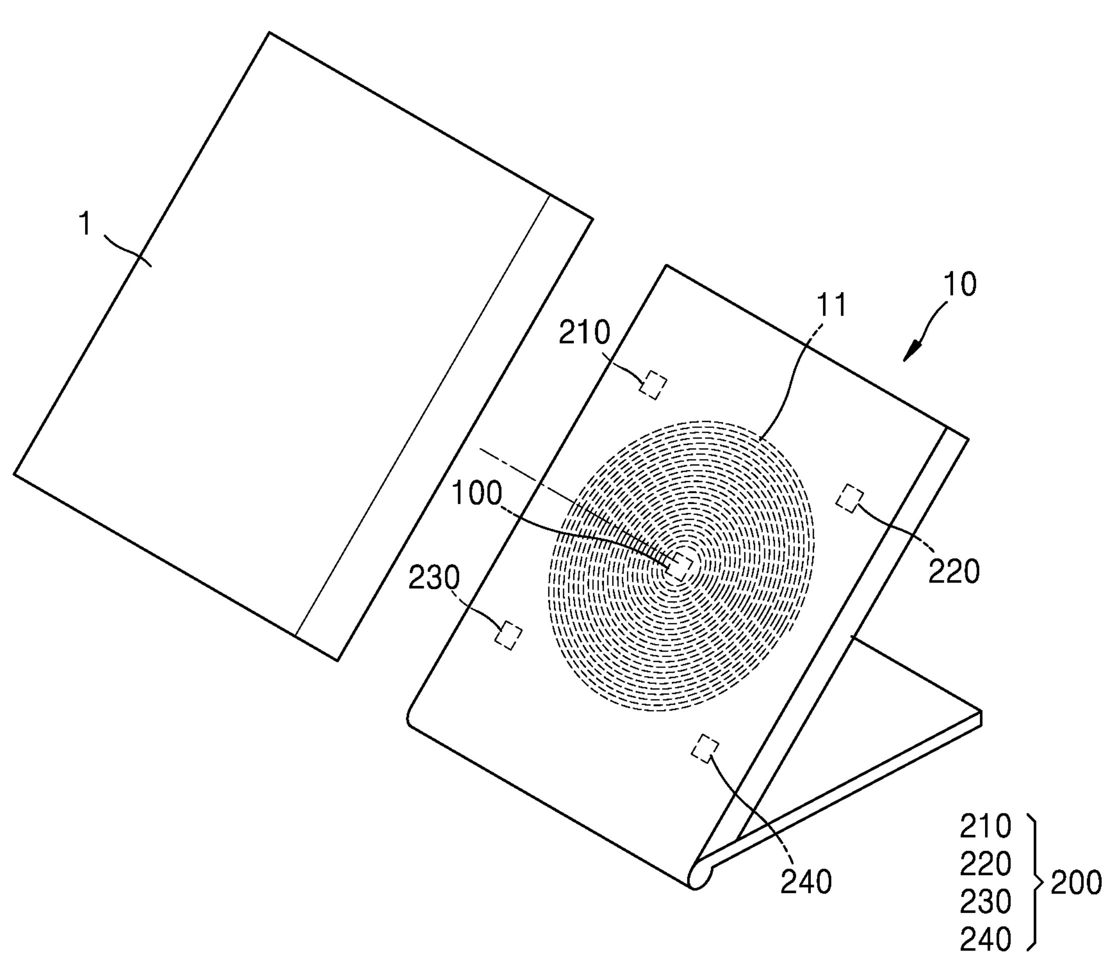
FIG. 1 is a perspective view showing a wireless charging system according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

While embodiments according to the present disclosure are capable of various modifications and may have various embodiments, particular embodiments thereof are shown by way of example in the drawings and will herein be described in detail. It should be understood, however, that there is no intent to limit the disclosure to particular embodiments, but on the contrary, the disclosure is to cover all modifications, equivalents, and alternatives falling within the spirit and scope thereof. Although shown in some embodiments to describe the disclosure, like numbers refer to like elements.

Hereinafter, aspects of some embodiments will be described in more detail with reference to the accompanying drawings, and the same or corresponding elements will be denoted by the same reference numerals when described with reference to the drawings and the redundant descriptions thereof will be omitted.

As used herein, although the terms, 'first', 'second', etc. are only used to distinguish one element from another, these elements should not be limited by these terms.

As used herein, the singular forms are intended to include the plural forms as well, unless the context clearly indicates otherwise.

It will be further understood that the terms "comprise," "comprising," "include," "including," "have," "having," and the like, when used herein, specify the presence of stated features and/or elements, but do not preclude the presence or addition of one or more other features and/or elements.

In the drawings, the sizes of elements may be exaggerated or reduced for convenience of description. For example, since the size and thickness of each element is arbitrarily shown in the drawings for convenience of description, the disclosure is not necessarily limited to those illustrated.

As used herein, an x-axis, a y-axis, and a z-axis are not limited to three axes on an orthogonal coordinate system, and may be interpreted as a wide meaning including the same. For example, the x-axis, y-axis, and z-axis may be orthogonal to one another, but may also refer to different directions that are not orthogonal to one another.

When some embodiments are otherwise implementable, a particular process sequence may be performed differently from a sequence described. For example, two processes described in succession may be performed substantially simultaneously, or may be performed in an order opposite to an order described.

The terminology used herein is for the purpose of describing particular embodiments only and is not intended to be limiting of the disclosure. It will be further understood that the terms "comprise," "comprising," "include," "including," "have," "having," etc., when used herein, specify the presence of stated features, integers, steps, operations, elements, and/or components, but do not preclude the presence or addition of one or more other features, integers, steps, operations, elements, components, and/or groups thereof.

Hereinafter, a wireless charging system according to some embodiments will be described in more detail with reference to FIGS. 1, 2 and 4.

FIG. 1 is a perspective view showing a wireless charging system according to some embodiments. FIG. 2 is a diagram illustrating positions of sensor portions (or sensors, sensor components, or sensor circuits) according to some embodiments. FIG. 4 is a block diagram illustrating a wireless charging system according to some embodiments.

Figure 2:
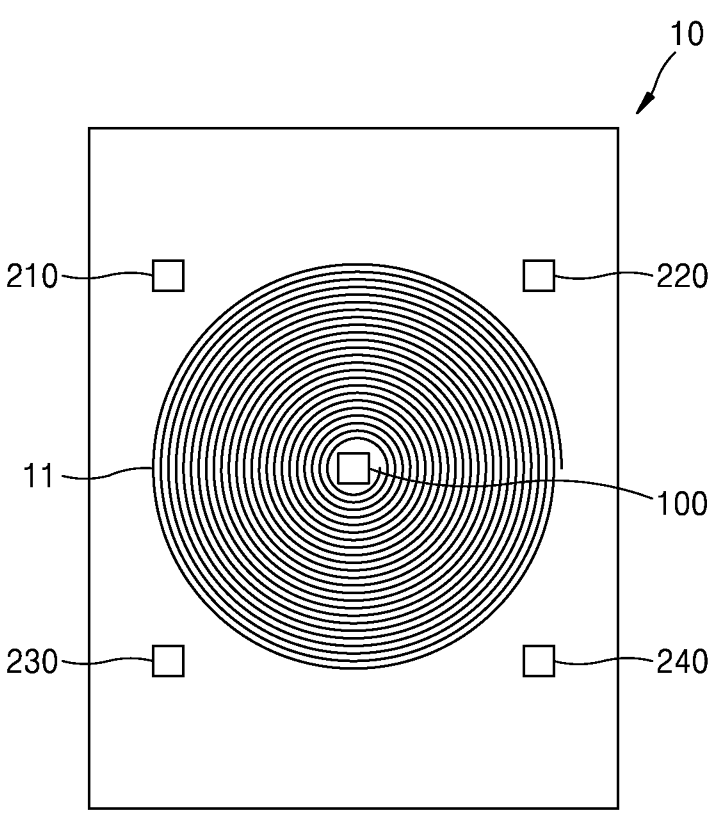
FIG. 2 is a diagram illustrating positions of sensor portions according to some embodiments.
Figure 4:
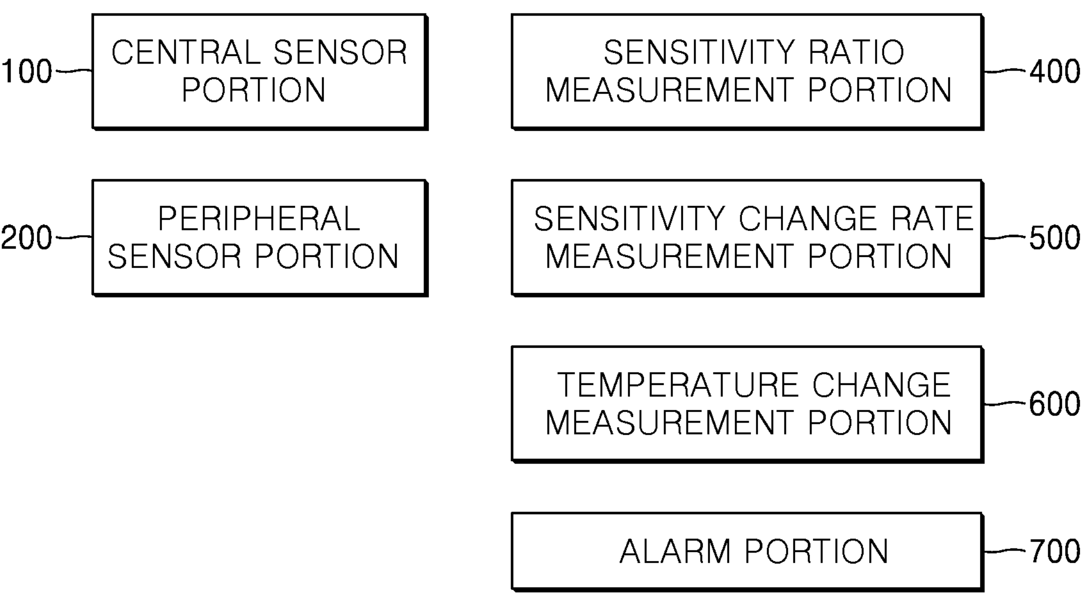
FIG. 4 is a block diagram illustrating a wireless charging system according to some embodiments.

Referring to FIGS. 1, 2 and 4, the wireless charging system according to some embodiments includes a central sensor portion (or central sensor, or central sensor component, or central sensor circuit) 100 configured to sense swelling of a secondary battery 1, a peripheral sensor portion (or peripheral sensor, or peripheral sensor component, or peripheral sensor circuit) 200 located in a peripheral portion of the central sensor portion 100 and sensing swelling of the secondary battery 1, and a sensitivity ratio measurement portion (or sensitivity ratio measurement component, or sensitivity ratio measurement circuit) 400 measuring a ratio of sensitivity of the peripheral sensor portion 200 to sensitivity of the central sensor portion 100.

At this time, the sensitivity ratio measurement portion 400 stops a charging progress when the measured sensitivity ratio of sensitivity of the peripheral sensor portion 200 to sensitivity of the central sensor portion 100 is greater than a preset ratio.

A wireless charging device (or wireless charger) 10 according to some embodiments may charge the secondary battery 1. The wireless charging device 10 may include a coil 11. The coil 11 is a charging coil and may charge the secondary battery 1 through an electromagnetic induction method.

According to some embodiments, swelling of the secondary battery 1 may be sensed through the central sensor portion 100 and the peripheral sensor portion 200. The central sensor portion 100 may be located in the central portion (or center) of the wireless charging device 10, and the peripheral sensor portions 210, 220, 230, and 240 may be located in each of four corners of the wireless charging device 10. The peripheral sensor portions 210, 220, 230, and 240 may be respectively located on four outer portions of the coil 11 inside the wireless charging device 10.

The central sensor portion 100 and the peripheral sensor portion 200 may each include an ultrasonic sensor. A degree of swelling of the secondary battery 1 may be sensed through the ultrasonic sensor by searching for a surface position of the swollen secondary battery 1.

When the secondary battery 1 swells, because the central portion swells more than the peripheral portion, an amount of swelling sensed by the central sensor portion 100 may be greater than an amount of swelling sensed by the peripheral sensor 200. Also, as the swelling becomes more severe, because the central portion of the secondary battery 1 swells more than the peripheral portion, the sensitivity of the central sensor portion 100 may be greater than that of the peripheral sensor portion 200.

Accordingly, according to some embodiments, the wireless charging system may include the sensitivity ratio measurement portion 400, and the sensitivity ratio measurement portion 400 may measure the ratio of the sensitivity of the peripheral sensor portion 200 to the sensitivity of the central sensor portion 100. In addition, the sensitivity ratio measurement portion 400 may stop the charging progress of the wireless charging device 10 or prevent charging from starting when the ratio of the sensitivity of the peripheral sensor portion 200 to the sensitivity of the central sensor portion 100 is greater than the preset ratio.

When swelling occurs to the extent exceeding a set standard through the sensitivity ratio measurement portion 400 as described above, by stopping the charging of the secondary battery 1, the possibility of ignition of the secondary battery 1 undergoing swelling may be prevented in advance, and charging stability of the secondary battery 1 may be secured.

For example, when the ratio of the sensitivity of the peripheral sensor portion 200 to the sensitivity of the central sensor portion 100 measured by the sensitivity ratio measurement portion 400 is less than 105%, swelling may be determined to be normal. Also, when the ratio of sensitivity is equal to or greater than 105% and equal to or less than 110% s, a danger signal may be generated due to the swelling of the secondary battery 1. In addition, when the ratio of sensitivity exceeds 110%, the charging progress of the wireless charging system may be stopped. As a method of stopping the charging progress, the power of the wireless charging device 10 may be forcibly turned off to prevent charging from proceeding.

According to some embodiments, the wireless charging system may further include a sensitivity change rate measurement portion 500 measuring a sensitivity change rate of each of the central sensor portion 100 and the peripheral sensor portion 200. At this time, the sensitivity change rate measurement portion 500 may stop the charging progress when the sensitivity change rate of each of the central sensor portion 100 and the peripheral sensor portion 200 measured during charging or before charging compared to the starting rates is greater than a preset value.

When the sensitivity change rate of each of the central sensor portion 100 and the peripheral sensor portion 200 compared to the starting rates is greater than the preset value, it means that the swelling of the secondary battery 1 is rapidly increasing, and this may mean that the possibility of damage and ignition phenomenon of the secondary battery 1 increases. Therefore, when the sensitivity change rate of each of the central sensor portion 100 and the peripheral sensor portion 200 compared to the starting rates is greater than the preset value, the sensitivity change rate measurement portion 500 immediately stops the charging progress of the wireless charging device 10, thereby preventing in advance the possibility of destruction and ignition due to the swelling of the secondary battery 1 and securing charging stability of the secondary battery 1.

According to some embodiments, the wireless charging system may further include a temperature change measurement portion 600 detecting a temperature change of each of the central sensor portion 100 and the peripheral sensor portion 200. In this regard, the temperature change measurement portion 600 may stop the charging progress when a measured temperature change value of each of the central sensor portion 100 and the peripheral sensor portion 200 is greater than a preset value.

In the case of an ultrasonic sensor, sound waves move faster when the temperature rises. That is, because the ultrasonic sensor detects the distance to an object closer at a high temperature, the accuracy of the ultrasonic sensor may decrease when the temperature rises. Therefore, as the temperature increases, the accuracy of detecting swelling through the ultrasonic sensor decreases, which may be difficult to predict the degree of swelling of the secondary battery 1.

Accordingly, according to some embodiments, the temperature change measurement portion 600 stops the charging progress of the secondary battery 1 when the measured temperature change value of each of the central sensor portion 100 and the peripheral sensor portion 200 is greater than the preset value, thereby preventing in advance the possibility of destruction and ignition, which is difficult to predict due to a decrease in swelling detection accuracy, and securing charging stability of the secondary battery 1.

According to some embodiments, the wireless charging system may further include an alarm portion 700 activating an alarm when a swelling sensing value of each of the central sensor portion 100 and the peripheral sensor portion 200 exceeds a preset value. When the swelling sensing value exceeds the preset value, it means that swelling is increasing, and thus, when the swelling occurs so as to exceed a reference value, an operator may quickly perform measures such as turning off the power of the wireless charging device 10 or isolating the secondary battery 1 from the wireless charging device 10, by operating the alarm.

Figure 3:
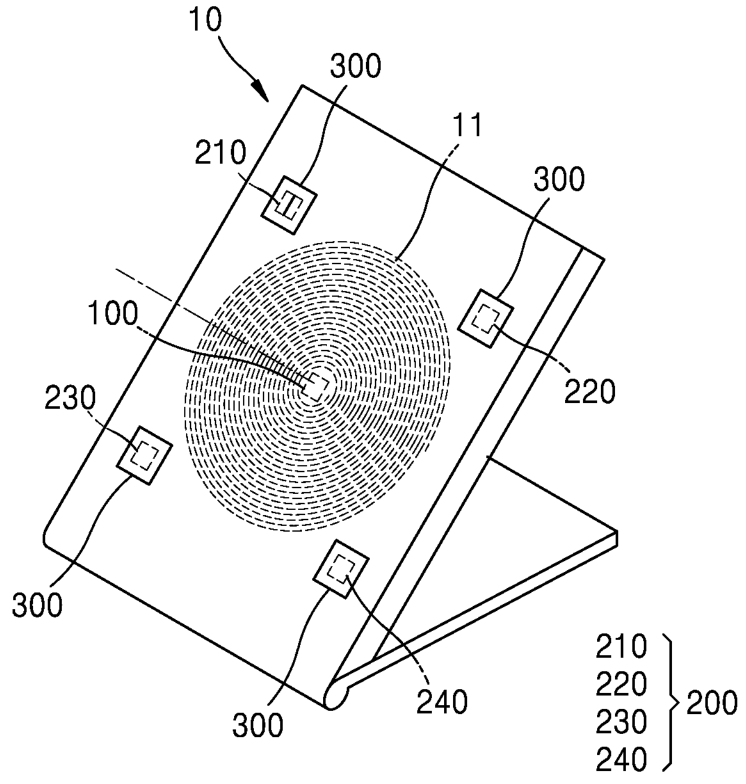
FIG. 3 is a diagram illustrating a wireless charging system to which a sensitivity improving portion is attached according to some embodiments.

FIG. 3 is a diagram illustrating a wireless charging system to which a sensitivity improving portion is attached according to some embodiments.

Referring to FIG. 3, the wireless charging system may further include a sensitivity improving portion 300 located on at least one of the central sensor portion 100 or the peripheral sensor portion 200.

The central sensor portion 100 and the peripheral sensor portion 200 may more precisely sense a swelling phenomenon of the secondary battery 1, by attaching the sensitivity improving portion 300 to an upper portion of each of the central sensor portion 100 and the peripheral sensor portion 200, which are ultrasonic sensors. The sensitivity improving portion 300 may be formed of a metallic tape, but is not limited thereto, and any substance or material capable of improving the sensitivity of the central sensor portion 100 and the peripheral sensor portion 200 may be possible.

As such, although aspects of some embodiments of the disclosure are described based on the embodiments illustrated in the drawings, these are examples. One of ordinary skill in the art may fully understand that various modifications and equivalent other embodiments are possible from the embodiments. Therefore, the scope of embodiments according to the present disclosure should be defined by the appended claims, and their equivalents.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical."

The use of the terms "a" and "an" and "the" and similar referents in the context of describing the disclosure are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Furthermore, the steps of all methods described herein can be performed in any suitable order unless otherwise indicated herein or otherwise clearly contradicted by context.

The disclosure is not limited to the described order of the steps. The use of any and all examples, or language (e.g., "such as") provided herein, is intended merely to better illuminate the disclosure and does not pose a limitation on the scope of the disclosure unless otherwise claimed.

Furthermore, numerous modifications and adaptations will be readily apparent to one of ordinary skill in the art without departing from the spirit and scope of the disclosure.

The wireless charging system according to some embodiments may determine swelling of a secondary battery and accordingly stop a charging progress of the secondary battery in order to prevent damage and ignition of the secondary battery in advance before or during charging a battery which uses the secondary battery, thereby securing a charging stability of the secondary battery.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and their equivalents.

What is claimed is:

1. A wireless charging system for charging a secondary battery, the wireless charging system comprising:

a charging coil on a surface of the secondary battery;

a central sensor at a central portion of the charging coil and configured to sense a swelling of the secondary battery;

a peripheral sensor on a peripheral portion of the charging coil and configured to sense the swelling of the secondary battery; and a sensitivity ratio measurement component configured to measure a ratio of sensitivity of the peripheral sensor to sensitivity of the central sensor, wherein the sensitivity ratio measurement component is configured to stop a charging progress in response to the measured ratio of sensitivity of the peripheral sensor to sensitivity of the central sensor being greater than a preset ratio.

2. The wireless charging system of claim 1, further comprising a sensitivity improver on at least one of the central sensor or the peripheral sensor.

3. The wireless charging system of claim 1, wherein the peripheral sensor is on each of four corners of a wireless charging device.

4. The wireless charging system of claim 1, further comprising a sensitivity change rate measurement component configured to measure a sensitivity change rate of each of the central sensor and the peripheral sensor, wherein the sensitivity ratio measurement component is configured to stop a charging progress in response to the measured sensitivity change rate of each of the central sensor and the peripheral sensor compared to starting rates being greater than a preset value.

5. The wireless charging system of claim 1, further comprising a temperature change measurement component configured to detect a temperature change of each of the central sensor and the peripheral sensor, wherein the temperature change measurement component is configured to stop a charging progress in response to a measured temperature change value of each of the central sensor and the peripheral sensor being greater than a preset value.

6. The wireless charging system of claim 1, further comprising an alarm component configured to operate an alarm in response to a swelling sensing value of each of the central sensor and the peripheral sensor exceeding a preset value.

* * * * *